Patented Nov. 18, 1952

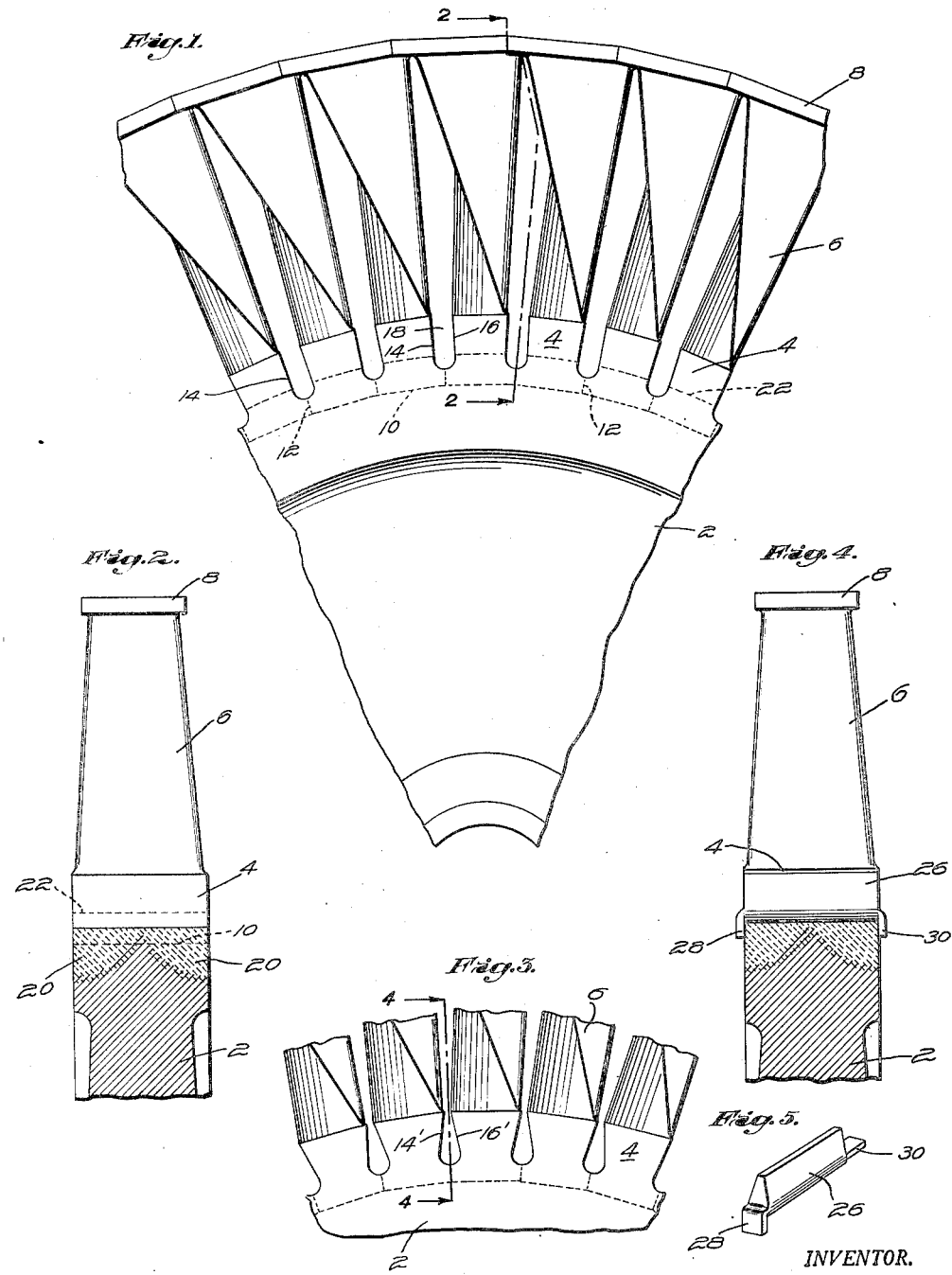

2,618,460

UNITED STATES PATENT OFFICE 2,618,460

TURBINE DISK CONSTRUCTION

Gordon T. Williams, Glastonbury, Conn., assignor to United Aircraft Corporation, East Hartford, Conn., a corporation of Delaware Application May 26, 1948, Serial No. 29,319

2 Claims. (Cl. 253—39)

This invention relates to a turbine rotor or disc construction and particularly to a turbine rotor adapted for high temperature operation.

In the manufacture of turbine discs, the blades have been attached at their roots to a central hub either by mechanical fastenings or by welding. A welded disc becomes effectively a one-piece disc with the blades structurally integral with the hub and is an advantageous arrangement. After a disc is welded, however, radial cracks have frequently occurred in the disc extending inwardly from the abutting side surfaces of adjacent blade roots. These cracks tend to increase in length during turbine operation and seriously weaken the disc. One cause of the cracks is believed to be the circumferential stresses set up during welding since the abutting blade roots are heated and expand to a much greater extent than the hub. Furthermore, the shrinking of the weld metal on cooling pulls the blades inwardly, further increasing the bursting stresses.

A feature of the invention is an arrangement of the turbine disc to prevent or minimize the development of these bursting stresses and thereby avoid the cracking of the disc. More specifically, a feature of the invention is the provision of wide slots between adjacent blade roots by which to permit the roots to expand circumferentially without causing opposed side surfaces of adjacent blade roots to engage each other.

Where the requirements for efficiency of the power plant in which the turbine disc is incorporated are stringent, it may be undesirable to leave the slots in the disc through which the power fluid may leak. A feature of the invention is the positioning of an insert in the slot to reduce leakage therethrough.

Under certain operating conditions, the loading on the blade may produce vibrations which might cause or increase the length of the cracks in the disc. One feature of the invention is the arrangement of the insert in such a manner that during turbine operation it functions as a vibration damper.

Other objects and advantages will be apparent from the specification and claims, and from the accompanying drawings which illustrate an embodiment of the invention.

Fig. 1 is a side elevation of a part of the turbine disc.

Fig. 2 is a sectional view substantially on the line 2—2 of Fig. 1.

Fig. 3 is a fragmentary side elevation of a modified form of disc.

Fig. 4 is a sectional view substantially along the line 4—4 of Fig. 3, but with an insert in the disc.

Fig. 5 is a perspective view of the insert.

Referring first to Fig. 1, the turbine disc includes a hub 2 to the periphery of which the blade roots 4 are welded. Each of the blade roots supports a blade 6 which may have at its outer end a shroud 8. In assembling the blades on the hub in preparation for welding, the blades are arranged in a ring in the angular position in the plane of the disc they will assume when the disc is finished, the roots of the blades at this time being somewhat longer, extending, for example, as shown in Fig. 2, to the dotted line 10 which represents the inner surface of the blade roots prior to the welding operation. For the purpose of properly spacing the blade roots apart, the roots may be formed as shown in dotted lines in Fig. 1, in which the side surfaces 12 of the blade roots are in contact with each other adjacent to the inner root surface 10. The remainder of the opposed side surfaces of the adjacent roots are relieved by being cut away as indicated at 14 and 16, Fig. 1, so that when the blades are assembled in readiness for welding, the relieved surfaces of the blade roots will form wide slots 18 between adjacent blade roots. It will be noted that this slot extends inwardly of the disc beyond the general outer boundary of the finished weld 20 as represented by the line 22, Fig. 1.

During the welding operation, it may be understood that the slots 18 may be filled with a suitable material such as ceramic rods to prevent spill-out of the weld material during the welding operation. It will be apparent that the dam material used will be much more readily compressible than the material of the weld or of the blade roots so that when the disc shrinks during cooling after the welding operation the opposite side surfaces 14 and 16 of the slots 18 may move toward each other to prevent the formation of compressive stresses circumferentially in the blade roots.

The blades having been assembled in readiness for welding, the hub 2 is positioned within the ring of blades. The blade roots are then welded to the hub to form integral discs by the deposition of weld metal 20 between the blade roots and the periphery of the hub 2. The manner in which this welding is accomplished is not a feature of the invention. It will be understood, however, that the welding is preferably done under such conditions that the outer periphery of the weld, when finished, will be approximately along the line 22 which is radially outward of the bases of the slots 18.

In the finished turbine disc, as shown in Figs. 1 and 2, in which the side surfaces of the disc have been machined, the opposed surfaces of adjacent blade roots are spaced apart wide enough so that they cannot come in contact with one another regardless of the amount of contraction taking place during the cooling of the turbine disc after the welding operation. With such a groove or slot, it will be apparent that the side surfaces of the slot also will remain out of contact during any operating conditions of the disc.

The side surfaces 14 and 16 of the slots may extend radially of the disc, or they may be parallel, as shown in Fig. 1.

In certain cases, as, for the purpose of reducing the area of the slot, the opposed side surfaces 14' and 16', Fig. 3, may converge in a direction radially outward of the disc. With the arrangement shown in this figure, the converging side surfaces of the disc will function to hold in the slots a dam of ceramic or other material shaped to correspond substantially to the shape of the slot. In either configuration, however, it will be understood that the width of the slot will be such that the side surfaces will be spaced apart during the welding operation and during the cooling of the disc thereafter.

Although a disc of this character is satisfactory in many installations, it is possible that the strict requirements of turbine efficiency will make the power losses by the leakage of power fluid through the slots undesirable. To avoid this, the slots may be filled with an insert 26, Figs. 4 and 5, which is substantially the shape of the slot and which may be held against endwise movement in the slot by tabs 28 and 30. As shown in Fig. 5, one of the tabs may extend longitudinally of the insert until the latter has been placed within the slot after which it can be bent down into engagement with the side of the disc as shown in Fig. 4. As the disc rotates, the insert 26 will be moved radially outward into engagement with the surfaces 14' and 16' and will function to damp any vibrations developing in the individual blades. It will be apparent that the insert 26 may be left slightly loose within the slot so that it will permit circumferential expansion of the blade roots during turbine operation, the side surfaces of the slot having such an angle of convergence that the insert may slide radially inward on the surfaces 14' and 16', as the blade roots tend to expand circumferentially.

It is to be understood that the invention is not limited to the specific embodiment herein illustrated and described, but may be used in other ways without departure from its spirit as defined by the following claims.

I claim:

1. In a turbine disc, a hub portion, a row of blades extending radially from the periphery of and in the plane of the hub, each of said blades having a root connecting the blade to the hub, said roots forming a root portion of the disc surrounding the hub portion, said roots of adjacent blades being circumferentially spaced apart on the hub to define substantially radial slots in the root portion between adjacent blade roots, each of said slots having the opposite side surfaces spaced apart a uniform distance from end to end of the slot, each of said slots extending inwardly from the peripheral surface of the root portion, the opposite side surfaces of each slot converging in a radially outward direction, and an insert in said slot with its side surfaces converging to correspond with the converging side surfaces of the slot, said insert being movable radially within the slot, and means for retaining said insert axially within the slot.

2. In a turbine disc, a hub portion, a row of blades extending radially from the periphery of and in the plane of the hub portion, each of said blades having a root connecting the blade to the hub, said roots forming a root portion of the disc surrounding the hub portion, the root portion and the hub portion being integrally connected together by a weld zone located between the root portion and the hub portion, said root portions of adjacent blades being circumferentially spaced apart on the hub to define substantially radial slots in the root portion between adjacent blade roots, each of said slots having the opposite side surfaces spaced apart a uniform distance from end to end of the slot, each of said slots extending inwardly from the peripheral surface of the root portion, the opposite side surfaces of each slot converging in a radially outward direction, and an insert substantially filling each slot with its opposite side surfaces converging in the same manner as the slot, said insert being radially movable within the slot and having means thereon adjacent opposite ends for retaining it axially within the slot.

GORDON TRACY WILLIAMS.

REFERENCES CITED

The following references are of record in the file of this patent:

UNITED STATES PATENTS

| Number | Name | Date |
|---|---|---|
| 893,077 | Karrer | July 14, 1908 |
| 978,310 | Kruger | Dec. 13, 1910 |
| 1,015,313 | Green | Jan. 23, 1912 |
| 1,258,462 | Rice | Mar. 5, 1918 |
| 1,314,806 | Hirt | Sept. 2, 1919 |
| 2,310,412 | Flanders | Feb. 9, 1943 |
| 2,380,276 | Warren | July 10, 1945 |
| 2,384,919 | Huber | Sept. 18, 1945 |
| 2,392,281 | Allen | Jan. 1, 1946 |
| 2,405,146 | Huber | Aug. 6, 1946 |

FOREIGN PATENTS

| Number | Country | Date |
|---|---|---|
| 593,918 | Great Britain | Oct. 29, 1947 |